Oct. 7, 1947.                    V. D. LANDON                    2,428,424
                              PULSE-ECHO ALTIMETER
                              Filed May 30, 1945

INVENTOR.
Vernon D. Landon
BY
        CD Cuska
                ATTORNEY

Patented Oct. 7, 1947

2,428,424

UNITED STATES PATENT OFFICE 2,428,424

PULSE-ECHO ALTIMETER

Vernon D. Landon, Princeton, N. J., assignor to Radio Corporation of America, a corporation of Delaware Application May 30, 1945, Serial No. 596,691

5 Claims. (Cl. 250—1.66)

My invention relates to object locating and/or distance determining radio systems and particularly to radio altimeters.

An object of the invention is to provide an improved method of and means for locating and/or determining the distance to a radio wave reflecting object or surface.

A further object of the invention is to provide an improved radio altimeter that is simple and inexpensive.

In practicing a preferred embodiment of the invention, a superregenerative oscillator is employed both for transmitting pulses of radio energy and for receiving these pulses after reflection from the earth or other reflecting surface. A periodically varying voltage, such as a sawtooth voltage, is applied to the oscillator for cyclically varying its blocking rate. Upon the reception of reflected pulses, however, the oscillator is "locked-in" momentarily by said pulses when the period of the varying blocking rate gets close to the period required for the transmitted pulses to travel to the reflecting surface and back to the oscillator. The resulting momentary pause in the change in the oscillator pulsing rate due to said "lock-in" is utilized to indicate the pulse reception. This is accomplished by applying the oscillator pulses to a frequency counter and utilizing the counter output to deflect the cathode ray of an indicator tube in one direction and by simultaneously deflecting the cathode ray in another direction along a distance scale. The indication produced on the cathode-ray trace by said momentary "lock-in" gives the distance to the pulse reflecting object or surface.

Figure 1:
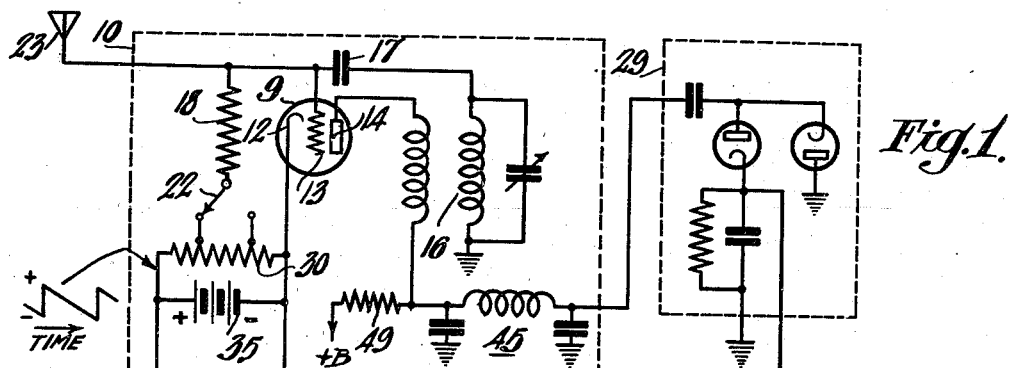
Figure 2:
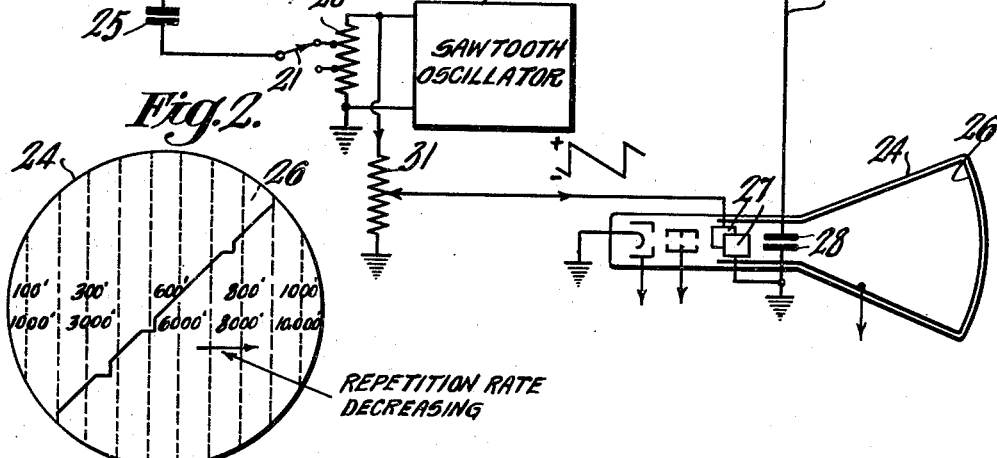
Figure 3:
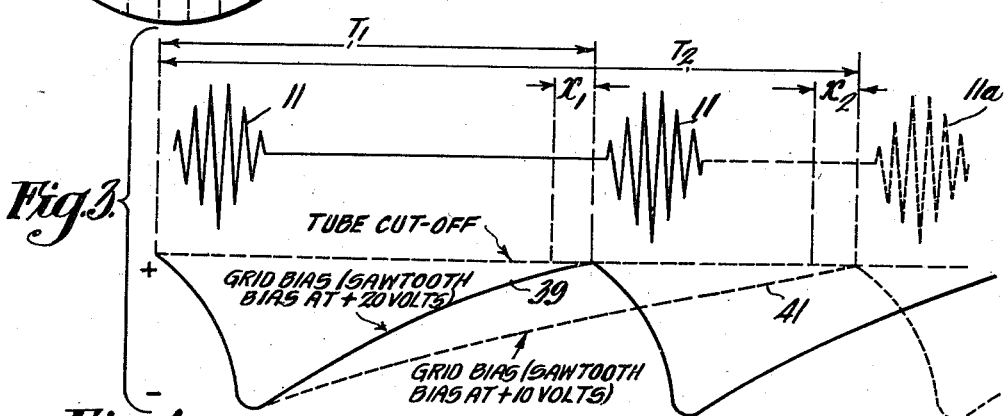
Figure 4:
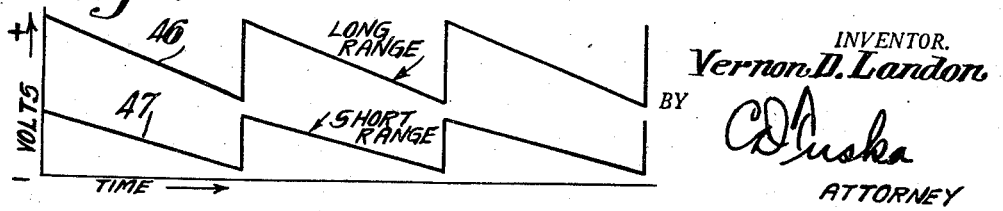

The invention will be better understood from the following description taken in connection with the accompanying drawing in which Figure 1 is a circuit diagram of a radio altimeter embodying the invention, Figure 2 is a view of the screen end of the cathode-ray tube in Fig. 1 showing the type of distance indication that is obtained by the system of Fig. 1, Figure 3 is a group of graphs that are referred to in explaining the operation of the system shown in Fig. 1, and Figure 4 is a group of graphs that show pulse repetition rate controlling voltages for two different range scales.

Fig. 1 shows the invention applied to a radio altimeter which comprises an oscillator 10, similar to the kind employed in superregenerative radio receivers, which oscillates at a radio frequency but which blocks or quenches periodically to produce pulses of radio frequency energy as illustrated by the graphs 11 in Fig. 3. Various circuits for oscillators of this type are well known. The particular one illustrated comprises a vacuum tube 9 having a cathode 12, a control grid 13 and an anode 14. The anode circuit is coupled to the grid circuit through a transformer 16 and a grid capacitor 17, the secondary of the transformer 16 being tuned to the desired radio frequency.

The blocking or pulse rate of the oscillator 10 is determined by the capacity of the grid capacitor 17 and the resistance of the grid leak resistor indicated at 18, and by the bias voltage on the grid 13. A cyclically varied bias voltage is applied to the grid 13 from a sawtooth wave generator 19 through a tapped resistor 20, a switch 21, a blocking capacitor 25, a resistor 30 and the grid leak resistor 18.

It will be evident that the repetition rate of the radio pulses 11 increases as the positive polarity sawtooth voltage increases in amplitude, and that the amount of this change in pulse rate may be varied by the switch 21. The direct-current bias supplied by a battery 35 may be adjusted by a switch 22 associated with taps on the resistor 20.

The oscillator 10 acts both as transmitter and receiver; the radio pulses 11 are radiated from an antenna 23, and after reflection from the earth or other surface they are received at the antenna 23 and impressed upon the grid 13. If at the time of pulse reception, the blocking rate of the oscillator 10 is such that the oscillator is in the blocked condition but nearly ready to produce another radio pulse 11, then the received pulses increase the repetition rate of the pulses 11 for a short time; that is, the oscillator locks in momentarily with the received pulses. However, the changing bias applied from the sawtooth generator 19 shortly overcomes the lock-in condition and the repetition rate of the pulses 11 resumes its change as a function of the changing bias.

A cathode-ray indicator tube 24 is employed which has a phosphorescent screen 26 and horizontal and vertical deflecting plates 27 and 28, respectively. The distance indications such as shown in Fig. 2 are produced by deflecting the cathode ray of the tube 24 horizontally along a distance axis and by deflecting it vertically as a function of the repetition rate of the radio pulses 11. Such vertical deflection is obtained by supplying the pulses 11 to a frequency counter 29 after demodulation by the superregenerative circuit, and by applying the resulting counter output voltage over a conductor 40 to the deflecting plates 28. A filter 45 preferably is included in the connection between the oscillator and the counter to filter out the carrier wave, the filter input terminal being connected to the high potential end of an output impedance resistor 49.

The horizontal deflection, in the example illustrated, is obtained by applying a sawtooth wave from the sawtooth oscillator 19 through a potentiometer resistor 31 to the deflecting plates 27.

If no radio pulses are being received, the cathode ray of the tube 24 is deflected diagonally to produce a diagonal trace since the pulse repetition rate, and, therefore, the vertical deflecting voltage, is increasing during the horizontal deflection. However, any momentary pause in the increase of the pulse repetition rate resulting from the oscillator 10 locking in on received pulses causes the cathode-ray trace to become horizontal during the short interval the oscillator is locked in, thus indicating reception of pulses. This is illustrated in Fig. 2 where the appearance of the cathode-ray trace during reception of pulses from objects at three different distances is illustrated. It will be understood that the oscillator 10 remains locked in during the reception of several of the pulses 11, the number depending upon the repetition rate of the sawtooth biasing voltage supplied from the oscillator 19, the strength of the received pulses, etc.

The locking in of the oscillator 10 by the received pulses may be better understood by referring to Fig. 3 where the graph 39 represents the voltage on the oscillator grid 13 as determined by the grid circuit time constants with the sawtooth bias voltage at a certain voltage level. The broken line graph 41 is similar to the graph 39 but is for a decreased voltage level of positive sawtooth bias voltage. When the oscillator 10 oscillates to produce a pulse 11 of R.-F. energy, the grid 13 is driven so far negative by grid current biasing that the oscillator is blocked. It remains blocked until the charge on the grid capacitor 17 leaks off enough, as indicated by graph 39, to again permit oscillation whereby the next pulse 11 is produced at the end of the period $T_1$. However, in the region indicated at $x_1$ the oscillator 10 may be triggered by a received pulse to produce a pulse 11 earlier than it would be produced with the oscillator free running. Therefore, there is always a certain time interval, such as the interval $x_1$, during which the oscillator 10 locks in with received pulses. Pulses received during this interval cause the oscillator pulse rate to be constant until the sawtooth bias voltage has changed sufficiently to make the oscillator 10 fall out of the locked-in condition. The oscillator then resumes the production of radio pulses 11 at a decreasing repetition rate which is a function of the changing bias value.

The oscillator operating condition for a certain decreased positive bias value is illustrated by the graph 41 representing grid bias and by the graph 11a representing the radio pulse occurring at the end of a period $T_2$. As before, there is a time interval, indicated at $x_2$, during which the oscillator locks in with received pulses if, after reflection, they reach the antenna 23 during the interval $x_2$.

From the foregoing it will be seen that since the horizontal cathode-ray deflection along the distance scale on the tube 24 is produced by the same sawtooth wave that varies the pulse repetition rate, the cathode-ray trace is a plot of pulse repetition rate against distance or range; and when the pulse propagation time for transmission to a reflecting surface and return substantially equals the pulse repetition period an indication is produced opposite the correct distance marking on the distance scale.

It may be desirable to have two or more range scales both for increased accuracy at short ranges and for checking to see if an ambiguity is present in the indication. The said checking is done by switching to a different range scale. The ambiguity referred to results from the fact that if a reflected pulse is received during an interval such as $x_1$ or $x_2$, the oscillator will lock in momentarily regardless of whether the pulse was reflected from a surface at a distance where the transmit-return propagation time is equal to the repetition period (i. e., $T_1$ or $T_2$), whether the pulse was reflected from a surface at twice this distance or three times this distance. Likewise, the oscillator will lock in on pulses reflected from a given distance whether they were transmitted at the start of the period $T_2$ or were transmitted at the start of the preceding period. If the distance to the reflecting surface is greater than one-half the distance on the range scale, only one indication appears and there is no ambiguity.

If the distance to the reflecting surface is less than one-half the distance on the range scale, the pulses reflected from it may produce two or more indications, such as indications at 3000 feet, 6000 feet and 9000 feet on a range scale covering from 1000 feet to 10,000 feet where the reflecting surface is at 3000 feet. Here it is apparent that the reflecting surface is at 3000 feet as there is no indication at 1500 feet. However, if there is an indication at 1500 feet only, it is not apparent whether the reflecting surface is at 1500 feet or at a distance one-half or one-third the indicated distance. This may be checked by switching to a range scale covering from 100 feet to 1000 feet, for example. If now there is an indication appearing only at one-half 1500 feet or 750 feet, then that is the correct altitude or distance reading.

Fig. 4 shows the bias voltages applied to the grid 13 of the oscillator tube for two different range scales.

The bias voltage, represented by the graph 46, for the long range scale is supplied when the switches 21 and 22 are in the positions illustrated in Fig. 1. The bias voltage, represented by the graph 47, for the short range scale is supplied when the switches 21 and 22 are in their other position.

Merely by way of example, it may be noted that the frequency of the sawtooth bias voltage 46 or 47 may be anywhere from 30 cycles per second or less up to about 300 cycles per second. The pulse rate or blocking frequency may be made to vary from 10 kilocycles per second to 10 megacycles per second, for example.

I claim as my invention:

1. A radio distance determining system comprising a radio frequency oscillator of the superregenerative type which produces radio pulses at a controllable repetition rate, means for radiating said pulses to a reflecting surface, means for applying said pulses after reflection to said oscillator, means for producing a cyclically varying control voltage and means for cyclically varying said repetition rate as a function of said control voltage, said cyclic variation being at a low rate compared with said pulse rate, and means for indicating with reference to a distance scale the short interval during which said oscillator is locked in on reflected pulses.

2. A radio distance determining system comprising a self-blocking radio frequency oscillator which produces radio pulses at a controllable repetition rate, means for radiating said pulses to a reflecting surface, means for applying said pulses after reflection to said oscillator, means for producing a sawtooth control voltage and means for cyclically varying said repetition rate as a function of said control voltage, said cyclic variation being at a low rate compared with said pulse rate, and means for indicating with reference to a distance scale the short intervals during which said oscillator is locked in on reflected pulses.

3. A radio distance determining system comprising a radio frequency oscillator of the super-regenerative type which produces radio pulses at a controllable repetition rate, means for radiating said pulses to a reflecting surface, means for applying said pulses after reflection to said oscillator, means for producing a cyclically varying control voltage and means for cyclically varying said repetition rate as a function of said control voltage, said cyclic variation being at a low rate compared with said pulse rate, a cathode-ray tube indicator, means for deflecting the cathode ray of said tube along a distance axis as a function of said varying control voltage, and means for deflecting said cathode ray in a direction transverse to said distance axis as a function of said repetition rate whereby there is produced an indication on the cathode-ray trace in response to said oscillator locking in momentarily on received pulses.

4. A radio distance determining system comprising a radio frequency oscillator of the super-regenerative type which is self-blocking whereby it produces radio pulses at a controllable repetition rate, means for radiating said pulses to a reflecting surface, means for applying said pulses after reflection to said oscillator, means for producing and applying to said oscillator a cyclically varying bias voltage for cyclically varying said blocking rate, said cyclic variation being at a low rate compared with said pulse or blocking rate, a cathode-ray tube indicator, means for deflecting the cathode ray of said tube along a distance axis as a function of said varying bias voltage, and means for deflecting said cathode ray in a direction transverse to said distance axis as a function of said blocking rate whereby there is produced an indication on the cathode-ray trace in response to said oscillator locking in momentarily on received pulses.

5. A radio distance determining system comprising a radio frequency oscillator of the super-regenerative type which is self-blocking whereby it produces radio pulses at a controllable repetition rate, means for radiating said pulses to a reflecting surface, means for applying said pulses after reflection to said oscillator, means for producing a sawtooth voltage, means for applying said sawtooth voltage to said oscillator as a cyclically varying bias voltage for cyclically varying said blocking rate, said cyclic variation being at a low rate compared with said pulse or blocking rate, a cathode-ray tube indicator, means for deflecting the cathode ray of said tube along a distance axis as a function of said varying bias voltage, and means for deflecting said cathode ray in a direction transverse to said distance axis as a function of said blocking rate whereby there is produced an indication on the cathode-ray trace in response to said oscillator locking in momentarily on received pulses.

VERNON D. LANDON.

REFERENCES CITED

The following references are of record in the file of this patent:

UNITED STATES PATENTS

| Number | Name | Date |
|---|---|---|
| 2,045,224 | Gerhard | June 23, 1936 |
| 2,402,459 | Smith | June 18, 1946 |
| 1,979,225 | Hart | Oct. 30, 1934 |
| 2,225,046 | Hunter | Dec. 17, 1940 |